United States Patent [19]

Goldsmith

[11] 4,056,124

[45] Nov. 1, 1977

[54] FLUID MIXING VALVE FOR SUPPLYING CONTROLLABLE PROPORTIONS OF TWO INLET FLUIDS FROM A SINGLE OUTLET

[76] Inventor: Derek John Goldsmith, 6, Downe Avenue, Cudham, Sevenoaks, Kent, England

[21] Appl. No.: 659,917

[22] Filed: Feb. 20, 1976

[30] Foreign Application Priority Data

Feb. 22, 1975 United Kingdom ............... 7567/75
Mar. 14, 1975 United Kingdom ............. 10697/75

[51] Int. Cl.² ........................................... F16K 11/07
[52] U.S. Cl. ............................................. 137/625.17
[58] Field of Search ................................. 137/625.17

[56] References Cited

U.S. PATENT DOCUMENTS

| | | | |
|---|---|---|---|
| 2,501,657 | 3/1950 | Barkelew | 137/625.17 |
| 2,870,790 | 1/1959 | Jordan | 137/625.17 X |
| 3,168,112 | 2/1965 | Klingler | 137/625.17 |
| 3,297,051 | 1/1967 | Church et al. | 137/625.17 |
| 3,720,233 | 3/1973 | Shur | 137/625.17 |

Primary Examiner—William R. Cline
Attorney, Agent, or Firm—Fleit & Jacobson

[57] ABSTRACT

A fluid mixing valve comprising a housing provided with two fluid inlet ports and an outlet port for discharging fluid from the housing, a valve member within a bore in the housing axially movable in the bore for controlling fluid flow from the inlet ports to the outlet port and rotatable in the bore for controlling the relative volume rates of flow through the two inlet ports. The valve member is provided with two arcuate control surfaces eccentric in relation to the axis of rotation of the valve member and each co-operable with separate ones of the ports for inversely controlling, responsive to rotation of the valve member, the relative rates of flow through the individual inlet ports. Preferably one of the control surfaces co-operates with one of the inlet ports and the other co-operates with the outlet port for controlling relative fluid flow through the two inlet ports. The valve member may be controlled by a handle pivoted to a head for pivotal movement about a support axis extending at right angles to the valve member axis, the head being pivotally secured to the valve member whereby pivotal movement of the handle about the support axis causes axial movement and rotational movement of the head causes rotation of the valve member in the housing.

11 Claims, 5 Drawing Figures

FLUID MIXING VALVE FOR SUPPLYING CONTROLLABLE PROPORTIONS OF TWO INLET FLUIDS FROM A SINGLE OUTLET

This invention relates to an improved fluid mixing valve and, more especially, to a mixing valve which is suitable for mixing hot and cold water for domestic purposes, as for a wash basin, a bath or shower.

Various proposals have been made for fluid mixing valves for combining two streams of fluid utilising an axial movement of a valve member in a valve housing to control on/off and volume flow with rotational movement of the valve member controlling the relative proportions of flow from two inlets to an outlet. For example such valves are disclosed in British Pat. Spec. Nos. 1,310,101 and 1,240,454. However, generally these prior proposals do not provide for the change in ratio of flow rates of the different fluids to have anything approaching a linear response to rotation of the valve member with the result that over a central portion of the range of rotational movement the valves are over-sensitive which can be very inconvenient in domestic use, for example in a shower, as a very small change in rotational position of the valve member can cause several degrees difference in temperature of the output of water and this can be very distracting to a person using a shower. Also it has been proposed in various prior constructions to have the two inlet ports, for hot and cold water, directed into diametrically opposite sides of the valve housing with the result if one of the inlet pressures rises to a great extent above the other that cross flow is very possible. Also these prior constructions tend to have an agitated mixing action in a mixing chamber portion of the body of the valve leading to back pressure and reducing the maximum flow rate possible through the valve. The present invention provides for special arcuate control surfaces eccentric in relation to the axis of rotation of the valve element and co-operable with separate ports for inversely controlling, responsive to rotation of the valve member, the relative rates of flow through the individual ports. Although the disclosure of British Patent No. 1,195,882 appreciates the desirability of having a substantially linear relationship between the degree of mixing and the amount of rotation of a valve control member this Patent Specification has only devised a very involved valve system using separately rotatable control members which themselves have to be axially movable and consequently this prior construction does not have the ability of the construction of the present invention to have a simple single easily produced valve member which provides substantially linearly responsive mixing control and which is movable as a unit progressively to vary the volume throughput without changing the relative proportions of the two fluids under changing volume flow conditions.

According to the present invention there is provided a fluid mixing valve comprising a housing provided with two fluid inlet ports and an outlet port for discharging fluid from the housing, a valve member within a bore in the housing axially movable in the bore for controlling fluid flows from the inlet ports to the outlet port and rotatable in the bore for controlling the relative volume rates of flow through the two inlet ports, the valve member being provided with two arcuate control surfaces eccentric in relation to the axis of rotation of the valve member and each co-operable with separate ones of the ports for inversely controlling, responsive to rotation of the valve member, the relative rates of flow through the individual inlet ports.

Preferably the control surfaces comprise cut-away portions of the valve member axially spaced along the length of the valve member with the control surfaces provided on the same side of an imaginary diametric plane through the axis of the valve member. With this arrangement a very smooth merging flow of the two fluids into the outlet is provided with a minimum of turbulence whereby high flow rates can be obtained and where also there is a minimised tendency for cross flow to be possible from one inlet port to the other. Indeed it has been found in an exemplary embodiment that flow through one inlet port to the outlet can actually cause a suction to be applied to the other inlet port. While the control surfaces could be located each to operate with a separate inlet port for controlling the relative rates of flow through those ports it has been found preferable to have one inlet port controlled by one control surface and the other control surface operating in conjunction with an edge of the outlet port itself for controlling the relative rates of flow. This is particularly suitable where one rate of flow can normally be expected to be greater than the other as, in those circumstances, the inlet from a, for example, lower pressure source can be directed axially to the valve member with consequent minimising of the degree of change in direction of flow to the outlet while still providing sufficient change in direction of flow to minimise the tendency for cross flow. By having ports co-operable with the control surfaces each having an end boundary extending circumferentially of a bore in the housing and laterally extending boundaries intersecting the end boundary substantially at right angles thereto the on/off action can be controlled by the valve member without use of the subsidiary resilient seals which are only engaged finally to restrict seepage. Also with this arrangement the change in volume flow through the valve does not materially affect the relative proportions of the two fluids being mixed.

In a particular, preferred, embodiment of the invention a control head is mounted for rotation relative to the housing, a handle is pivoted to the head for pivotal movement about a support pin extending at right angles to the valve member axis, and the head is pivotally secured to the valve member whereby pivotal movement of the handle about the pin causes axial movement of the valve member in the housing, the valve member being rotatable responsive to rotational movements of the head.

The invention will be further described, by way of example, with reference to the accompanying drawings, wherein.

Figure 1:
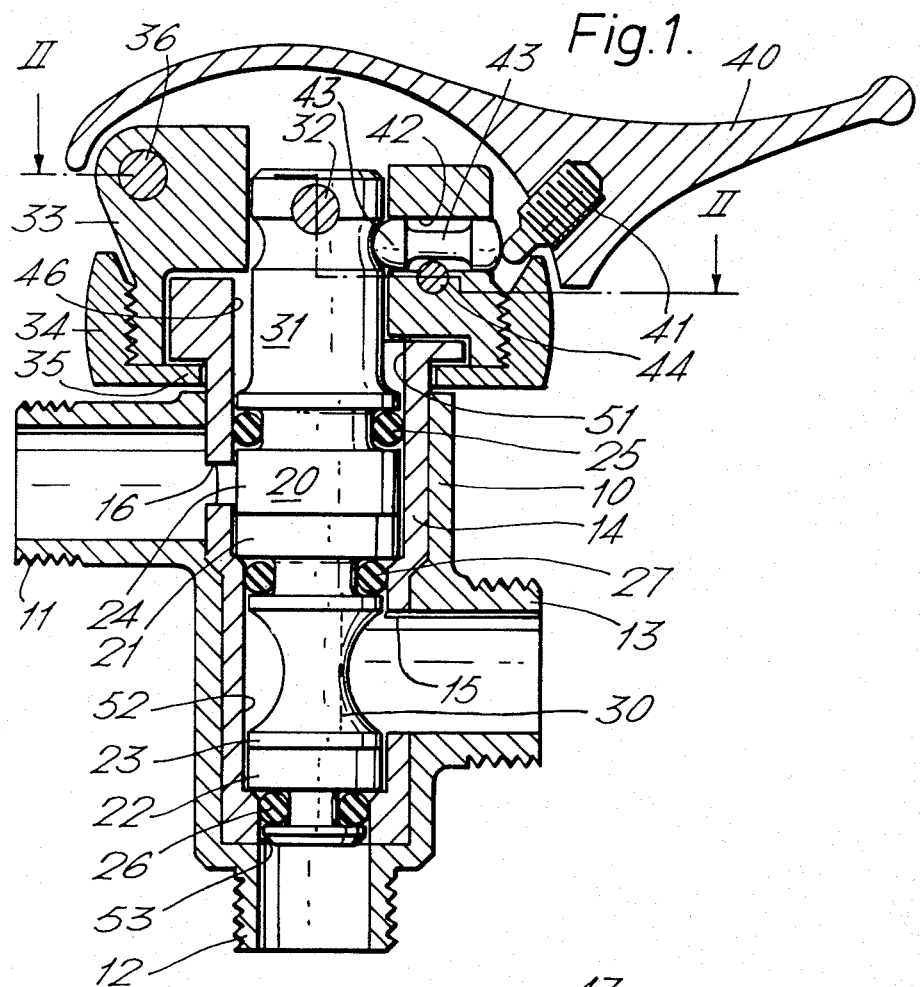
FIG. 1 is a cross-sectional elevational view of a domestic on/off and mixing valve embodying the invention.
Figure 2:
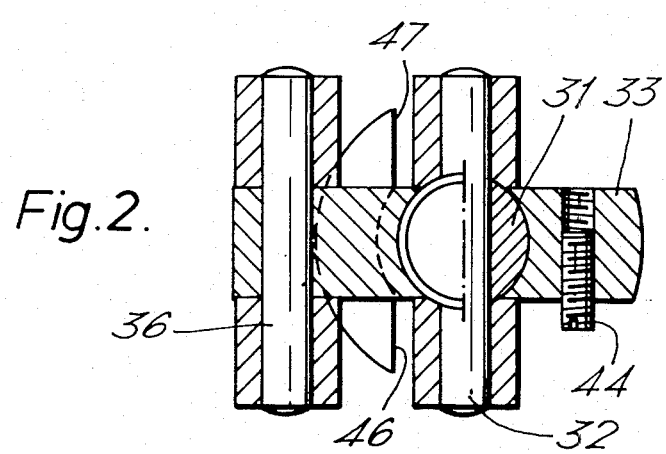
FIG. 2 is a cross-sectional view taken substantially along the line II—II of FIG. 1.

Referring to the drawings a domestic mixing valve for use in a wash basin or the like comprises a main housing which is formed in two parts with the inner part 10 comprised by a sleeve member 14 fitted in the main outer member 10. Although the members 10 and 14 may be formed integrally fabrication of the valve is eased if the sleeve member 14 can simply be slid as a unit into the outer part 10 of the housing. While it is quite usual for a simple force fit to be used as shown in FIG. 1, alternative fixing means may be used where convenient. The housing is provided with two inlet connections 11 and 12 and an outlet connection 13. Inlet ports through the member 14 are provided by a slot 16 and a bore 53 while an outlet port from the member 14 is provided by an outlet slot 15 communicating with the outlet connection 13.

Received within the housing is provided a valve member 20 which is capable of being both rotated and moved reciprocally within the housing under the control of a layer 40 as will be described later. In the closed condition of the valve as illustrated in FIG. 1 leakage from the valve is prevented by O-rings 25, 27 and 26 which respectively engage internal bores 51, 52 and 53 within the member 14. As shown the inlet port 16 is closed by a cylindrical part 24 of the valve member 20 while a cylindrical part 23 of the member 20 cuts off communication between the inlet port 53 and the outlet port 15. Arcuate flow control surfaces 21 and 22 are provided as cut-outs in the valve member 20, each of these control surfaces being eccentric in relation to the axis of rotation of the valve member 20 and having a larger radius of curvature than the radius of curvature of the outer surfaces of the valve member which they intersect. The arcuate shape of the flow control surface 21 can be appreciated from the sectional view of FIG. 4.

The upper part of the valve member 20 comprises a stem 31 which is connected by a pivot pin 32 with a handle or lever 40 which is itself pivoted by a pin 36 to a rotatable head 33, the axis of the pin 36 being at right angles to the axis of the valve member 20. The head 33 is retained in position for rotation relative to the housing by means of a ring 34 threaded onto the lower end of the head 33 and provided with a flange 35 which fits beneath a co-operating flange projecting from the upper part of the member 14. With this arrangement pivotal movement of the handle 40 about the axis of pin 36 causes the valve member 20 to be moved axially within the housing 10 while rotation of the handle 40 about the axis of the housing 10 causes corresponding rotational movement of the valve member 20.

A retaining or detent pin 43 is engageable with a recess in the upper part of the valve member 20 for retaining the valve member in its closed location as shown in FIG. 1. Pin 43 is retained within a bore 42 in the head 33 by means of a screw 44 which has one surface projecting partly into the bore 42 to be received within a cut-away part of the pin 43. A threaded projection 41 carried by the handle 40 is engageable with the pin 43 to hold it engaged with the recess in the valve member 20. The location of the point of engagement of the projection 41 with the pin 43 is beneath the plane passing through the axes of the pins 32 and 36 whereby there is an over-centre action so that once the handle 40 has been fully depressed the pin 43 will hold the valve member 20 in its closed position despite the action of water pressure against the lower end of the valve member through the inlet 12.

The screw 44 can be screwed to a greater or lesser extent into the bore in the head 33 and its end is engageable in one extreme position of rotation of the handle 40 with a surface 46 on the sleeve member 14 component of the housing 10. Consequently by adjusting the position of the screw 44 the amount of rotational movement of the handle 40 can be limited and set to provide a required degree of control of mixing of fluids admitted through the two inlet ports by the control action to be described.

Figure 3:
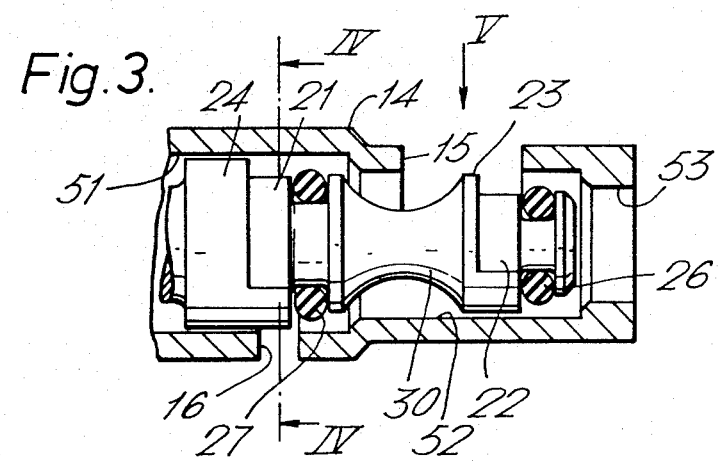
FIG. 3 is a fragmentary cross-sectional view showing part of the valve of FIG. 1 with the valve in a partly opened condition.
Figure 4:
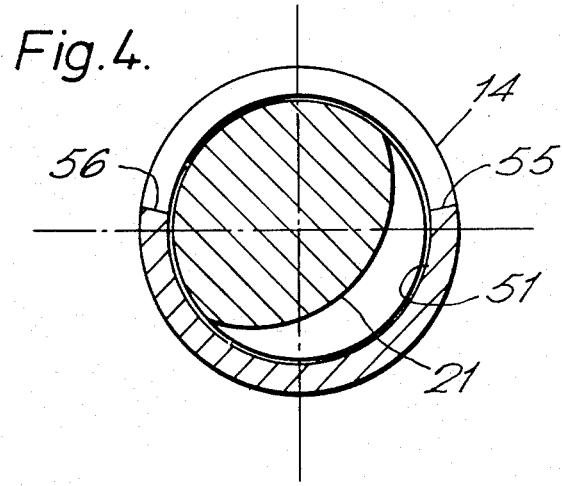
FIG. 4 is a cross-sectional view taken along the line IV—IV of FIG. 3.
Figure 5:
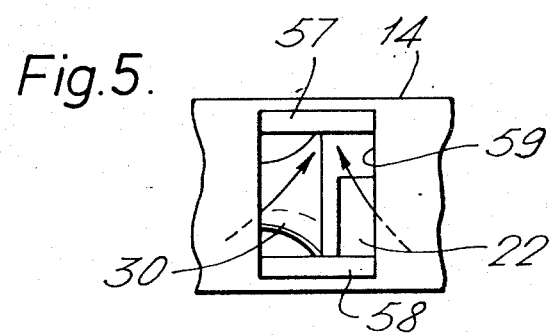
FIG. 5 is an elevational view taken generally in the direction of the arrow V in FIG. 3.

Operation of the valve member 20 will be better appreciated from consideration of FIGS. 3, 4 and 5. Upon initial axial movement of the valve member 20 away from its closed position towards the open position as shown in FIG. 3, at first the O-rings 27 and 26 leave the bores 53 and 30 so that the valve is no longer sealed shut. However, the valve is still closed, although not necessarily completely fluid tight, due to the cylindrical portions 23 and 24 still being received within the bores 52 and 51, respectively, between the respective inlets 53 and 16 and the outlet 15.

Upon continued axial movement of the valve member 20 the cut-out portions 21 and 22 come opposite the edges of the inlet port 16 and the outlet port 15 respectively so as to provide fluid flow past the cut-outs to the outlet port 15. By having the axial end edge of the port 16 nearer the outlet port 15 and the end edge 59 of the port 15 nearer the inlet port 53 extending circumferentially of the member 14 the volume flow of fluid through the outlet can be controlled responsive to the degree of axial movement of the valve member 20 within the housing 10. The relative proportion of the fluid to be mixed fed from the two inlets is controlld by the rotational position of the valve member exposing greater or lesser amounts of respective cut-outs 21 and 22 to the ports 16 and 15 respectively. Due to the fact that the cut-outs 21 and 22 are on the same side of an axial diametric plane of the valve member 20 and the fact that the ports 16 and 15 are on diametrically opposite sides of the body, as the degree of communication through one cut-out past one of the arcuate control surfaces is reduced the degree of communication past the other arcuate control surface is increased proportionately.

By having arcuate control surfaces 21 and 22 co-operating with axially extending side edges of the respective ports 15 and 16, these edges being shown at 57 and 58 as in FIG. 5, a substantially linear proportionality of a particular fluid flow to the amount of rotation of the valve member can be achieved, with the result that a more linear response of proportional fluid flows through the two inlets can be obtained than possible if the cut-outs had a bottom surface extending chordally of the rotatable valve member. That is, by having the lateral axially extending edges of the ports substantially at right angles to the circumferential end edge of the port, axial motion of the valve member to open and close the valve to fluid flow does not alter the ratio of cross-sectional areas of the ports.

Also by having the two fluid flow control arcuate surfaces on same side of a diametral plane of the valve member 20, one co-operating with an inlet port and the other co-operating with the outlet port, flow to the outlet port 15 from the two inlet ports passes in the same direction circumferentially round a reduced diameter spool portion 30 of the valve member 20. Due to this similar direction of flow the two streams merge one with the other very smoothly with a minimum of turbulence and interference with through flow. Indeed, with this arrangement, it has been found in a particular example that when one of the fluid supplies is cut off, a suction is applied at that inlet as a result of the fluid flow from the other inlet. This compares with the back pressure which might be expected if there was extreme turbulence and interference of fluid flow of the mixed stream leaving the outlet 31 to pass to a tap or the like.

It will be appreciated from the above explanations that the O-ring seals are so located relative to the housing and valve member they seal the communication from the respective inlet ports to the outlet port upon axial closing movement of the valve member in the housing subsequent to the valve member body having closed the communication between each of the inlet ports and the outlet port means of the cylindrical body portions 23 and 24. Because of the fact that the O-rings do not sealingly engage the internal bores until after main closing of the valve has already taken effect the pressure differentials across the O-rings are very low at the time of sealing and thus wear on the O-rings is minimised, greatly increasing their expectation of reliable life, the O-rings simply sealing against any loss due to seepage after the hard metal ports have been closed by the cylindrical portions of the valve member.

While a fluid mixing valve has been described utilising a pivotal and rotational lever type handle for controlling the valve member it will be appreciated that, as convenient, alternative means may be utilised for controlling axial and rotational movement of the valve member separately relative to the housing within which it is received. Thus, for example, two rotational knobs may be provided, one being threaded to move the valve member axially when held against rotation and the other being capable of rotating the valve member bodily.

1. A fluid mixing valve comprising a housing having a bore therein and provided with two spaced fluid inlet ports communicating with the bore at spaced locations therealong for the admission of fluid to the bore and an outlet port for discharging fluid from the bore, said outlet port communicating with the bore at a location intermediate the said spaced locations, and a valve member within the bore in the housing axially movable in the bore for controlling fluid flow from the respective inlet ports through the bore to the outlet port and rotatable in the bore for controlling the relative volume rates of flow through the two inlet ports, said valve member being provided with two arcuate control surfaces eccentric in relation to the axis of rotation of the valve member and each control surface co-operable with separate ones of the ports for inversely controlling, responsive to rotation of the valve member, the relative rates of fluid flow through the individual inlet ports, said control surfaces comprising cut-away portions of the valve member axially spaced along the length of the valve member, one of the control surfaces co-operating with one of the inlet ports and the other co-operating with the outlet port for controlling relative fluid flow through the two inlet ports, that one inlet port which is co-operable with one of said control surfaces having two spaced end boundaries with at least that one end boundary that is nearer the outlet port extending along part of the circumference of the bore in the housing and two lateral boundaries extending parallel with the axis of said bore and intersecting said one end boundary substantially at right angles thereto, and the outlet port having two spaced end boundaries with at least that one end boundary which is nearer the other inlet port extending along part of the circumference of the bore in the housing and lateral axially extending boundaries intersecting said one end boundary of the outlet port substantially at right angles thereto, whereby flow of fluid from the two inlet ports is controlled by co-operation of the one control surface with the one end boundary of said one inlet port and co-operation of the other control surface with the one end boundary of said outlet port.

2. A valve according to claim 1, wherein the valve member comprises two flow blocking portions adjacent respective ones of the control surfaces, one flow blocking portion being located on the valve member at a position such that one control surface is disposed between said one flow blocking portion and the outlet port and the other flow blocking portion being located such that said other control surface is positioned between said other flow blocking portion and the said other inlet port, said valve including a first O-ring seal carried by the valve member for sealing engagement with the housing to cut-off communication between said one inlet port and the outlet port in a closed condition of the valve, and a second O-ring seal carried by the valve member for sealing engagement with the housing to cut-off communication between said other inlet port and the outlet port in a closed condition of the valve, said seals being so located relative to the housing and the valve member that they seal upon axial closing movement of the valve member in the housing subsequent to the communication between each of the inlet ports and the outlet port having been substantially completely closed by said respective flow blocking portions of the valve member.

3. A valve according to claim 1, wherein the control suraces are positioned on the same side of an imaginary diametric plane through the axis of the valve member.

4. A valve according to claim 1, wherein there is provided a control head mounted for rotation relative to the housing, a handle, means pivotally mounting the handle to the head for pivotal movement about a support axis extending at right angles to the axis of rotation of the valve member, and means pivotally securing the head to the valve member whereby pivotal movement of the handle about the support axis causes axial movement of the valve member in the housing, the valve member being rotatable in the housing responsive to rotational movements of the head.

5. A valve according to claim 4, including retaining means for retaining the valve member in its valve closed position in the housing.

6. A valve according to claim 5, wherein the valve member has a recess therein and the retaining means comprises a detent engageable with the recess in the valve member for retaining the valve member in its valve closed position, the handle being provided with a retaining portion engageable with the detent for retaining the detent in the recess when the handle is pivoted relative to the head to an over-centre detent retaining position.

7. A valve according to claim 4, wherein means are provided for adjustably limiting rotation of the head relative to the housing.

8. A fluid mixing valve comprising a housing having a bore therein and provided with two spaced fluid inlet ports communicating with the bore at spaced locations therealong for the admission of fluid to the bore and an outlet port for discharging fluid from the bore, said outlet port communicating with the bore at a location intermediate the said spaced locations, and a valve member within the bore in the housing axially movable in the bore for controlling fluid flow from the respective inlet ports through the bore to the outlet port and rotatable in the bore for controlling the relative volume rates of flow to the two inlet ports, the valve member being provided with two cut out control surfaces each co-operable with separate ones of the ports for inversely controlling, responsive to rotation of the valve member, the relative rates of fluid flow through the individual inlet ports, said control surfaces comprising cut-away portions of the valve member axially spaced along a length of the valve member, one of the control surfaces co-operating with one of the inlet ports and the other co-operating with the outlet port for controlling relative fluid flow through the two inlet ports, the valve member comprising two flow blocking portions adjacent respective ones of the control surfaces, one flow blocking portion being located on the valve member at a position such that the one control surface is disposed between said one flow blocking portion and the outlet port and the other flow blocking portion being located such that the other control surface is positioned between said other flow blocking portion and the said other inlet port, said valve including a first O-ring seal carried by the valve member for sealing engagement with the housing to cut-off communication between said one inlet port and the outlet port in a closed condition of the valve, and a second O-ring seal carried by the valve member for sealing engagement with the housing to cut-off communication between said other inlet port and the outlet port in the closed condition of the valve, said seals being so located relative to the housing and valve member that they seal upon axial closing movement of the valve member in the housing subsequent to the communication between each of the inlet ports and the outlet port having been substantially completely closed by said respective flow blocking portions of the valve member.

9. A valve according to claim 8, wherein the control surfaces are arcuate, parallel with the axis of rotation of the valve member and eccentric in relation to said axis of rotation of the valve member.

10. A valve according to claim 8, wherein the control surfaces are positioned on the same side of an imaginary diametric plane through the axis of the valve member.

11. A valve according to claim 8, wherein there is provided a control head mounted for rotation relative to the housing, a handle, means pivotally mounting the handle to the head for pivotal movement about a support axis extending at right angles to the axis of rotation of the valve member, and means pivotally securing the head to the valve member whereby pivotal movement of the handle about the support axis causes axial movement of the valve member in the housing, the valve member being rotatable in the housing responsive to rotational movements of the head.

* * * * *